(12) United States Patent
Wroblewski

(10) Patent No.: US 11,600,982 B1
(45) Date of Patent: Mar. 7, 2023

(54) QUICK JUNCTION BOX

(71) Applicant: Mariusz Wroblewski, Southampton, NY (US)

(72) Inventor: Mariusz Wroblewski, Southampton, NY (US)

( * ) Notice: Subject to any disclaimer, the term of this patent is extended or adjusted under 35 U.S.C. 154(b) by 260 days.

(21) Appl. No.: 16/815,766

(22) Filed: Mar. 11, 2020

Related U.S. Application Data

(60) Provisional application No. 62/816,362, filed on Mar. 11, 2019, provisional application No. 62/873,309, filed on Jul. 12, 2019.

(51) Int. Cl.
*H02G 15/10* (2006.01)
*H01R 13/502* (2006.01)
*H01R 13/621* (2006.01)
*H01R 4/30* (2006.01)

(52) U.S. Cl.
CPC ............... *H02G 15/10* (2013.01); *H01R 4/30* (2013.01); *H01R 13/502* (2013.01); *H01R 13/621* (2013.01)

(58) Field of Classification Search
CPC ........ H02G 15/10; H02G 15/08; H02G 15/00; H02G 15/007; H02G 15/06; H02G 15/24; H01R 4/30; H01R 13/502; H01R 13/621; H01R 24/28; H01R 13/46; H01R 13/58; H01R 13/506; H01R 15/508
USPC .. 174/50, 480, 481, 53, 57, 58, 59, 60, 482, 174/64, 487, 490, 559, 560, 92, 138 F, 174/84 C; 220/3.2, 3.3, 4.02; 439/791, 439/794, 413, 425, 535, 536, 711, 790
See application file for complete search history.

(56) References Cited

U.S. PATENT DOCUMENTS

| | | | | |
|---|---|---|---|---|
| 3,033,913 A | * | 5/1962 | Dietze | H02G 3/16 174/59 |
| 3,049,582 A | * | 8/1962 | Kenneth | H01R 4/70 174/92 |
| 3,519,731 A | * | 7/1970 | Grunbaum | H01R 24/28 174/92 |
| 3,848,224 A | * | 11/1974 | Olivero | H02G 3/16 174/59 |
| 4,944,699 A | | 7/1990 | Velke, Sr. et al. | |
| 5,684,911 A | | 11/1997 | Burgett | |
| 6,220,893 B1 | | 4/2001 | Stephan | |
| 6,333,464 B1 | | 12/2001 | Ellison | |
| 6,527,598 B1 | * | 3/2003 | Opel | H01R 9/2408 439/709 |
| 7,012,194 B1 | * | 3/2006 | Wang | H01R 4/5066 174/92 |

(Continued)

*Primary Examiner* — Angel R Estrada
(74) *Attorney, Agent, or Firm* — Ashkan Najafi

(57) ABSTRACT

A quick junction box includes a junction box base having a cavity suitably sized and shaped for receiving therein the first set of existing wires and the second set of existing wires, a plurality of electrically conductive members housed within the junction box base, a junction box cover lid having a plurality of apertures for receiving a plurality of existing fasteners therethrough, and a lock for attaching the junction box cover lid to the junction box base. The plurality of electrically conductive members are configured to enable electrical connections between the first set of existing wires and the second set of existing wires while the first set of existing wires and the second set of existing wires remain physically spaced apart within the junction box housing.

15 Claims, 5 Drawing Sheets

(56) References Cited

U.S. PATENT DOCUMENTS

| | | | | |
|---|---|---|---|---|
| 7,109,416 B1 * | 9/2006 | Reed | ................... | H02G 15/113 |
| | | | | 174/53 |
| 7,438,605 B1 * | 10/2008 | Huang | ................ | H01R 13/506 |
| | | | | 174/92 |
| 8,960,973 B1 * | 2/2015 | Kathawate | ............... | H01R 4/70 |
| | | | | 174/92 |
| 10,003,137 B2 * | 6/2018 | Do | ........................... | H01R 4/38 |
| 10,557,623 B2 * | 2/2020 | Nicolai | ................... | H02G 3/16 |
| 2008/0087466 A1 | 4/2008 | Emerson | | |
| 2009/0017660 A1 | 1/2009 | Braganza et al. | | |

\* cited by examiner

QUICK JUNCTION BOX

CROSS REFERENCE TO RELATED APPLICATIONS

This is a non-provisional patent application that claims the benefit of U.S. provisional patent application Nos. 62/816,362 filed Mar. 11, 2019 and 62/873,309 filed Jul. 12, 2019, which are incorporated by reference herein in their entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to junction boxes and, more particularly, to a quick junction box for enabling fast and secure electrical splicing between a first set of existing wires and a second set of existing wires.

Prior Art

Although conventional methods of connecting electrical cables together are functional, they do not offer suitable simplicity. There exist a number of deficiencies in the art of connecting the ends of electrical cables together. As indicated by the prior art, the primary methods for splicing cable together require that the individual compress members together to assure a fixed connection. Also, the individual may need to tape the connected wires to one another to assure an insulated connection that will not be conducive to hazard. These methods are time consuming. It would be far better if a low profile device is able both to reduce the possibility of electrical hazard and to provide a reliable connection of the ends of spliced cable.

Accordingly, a need remains for a quick junction box in order to overcome at least one aforementioned shortcoming. The exemplary embodiment(s) satisfy such a need by providing a quick junction box that is convenient and easy to use, lightweight yet durable in design, versatile in its applications, and designed for a quick junction box for enabling fast and secure electrical splicing between a first set of existing wires and a second set of existing wires.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a quick junction box for enabling fast and secure electrical splicing between a first set of existing wires and a second set of existing wires. These and other objects, features, and advantages of the non-limiting exemplary embodiment(s) are provided by a quick junction box including a junction box base having a cavity suitably sized and shaped for receiving therein the first set of existing wires and the second set of existing wires, a plurality of electrically conductive members housed within the junction box base, a junction box cover lid having a plurality of apertures for receiving a plurality of existing fasteners therethrough, and a lock for attaching the junction box cover lid to the junction box base. Advantageously, the plurality of electrically conductive members are configured to enable electrical connections between the first set of existing wires and the second set of existing wires while the first set of existing wires and the second set of existing wires remain physically spaced apart within the junction box housing. Such a structural configuration provides a new, useful, and unexpected result of facilitating wire splicing without having to use connectors and/or electrical tape at the end of the wires.

In a non-limiting exemplary embodiment, the junction box base includes a centrally registered longitudinal axis, a plurality of divider walls equidistantly offset from the centrally registered longitudinal axis, respectively, and a plurality of channels abutted against the divider walls and situated at generally opposed corners of the junction box base, respectively. Advantageously, the divider walls are spaced apart from each other, and the channels are spaced apart from each other. Such a structural configuration provides a new, useful, and unexpected result of facilitating wire splicing without having to use connectors and/or electrical tape at the end of the wires.

In a non-limiting exemplary embodiment, the junction box base further includes a first electrically conductive pathway disposed at a first region of the cavity, a second electrically conductive pathway disposed at a second region of the cavity opposite to the first region of the cavity, and a third electrically conductive pathway disposed at a third region of the cavity and intermediately positioned between the first region and the second region. Advantageously, each of the first electrically conductive pathway, the second electrically conductive pathway, and the third electrically conductive pathway are configured to receive a corresponding one of the existing first set of wires and a corresponding one of the existing second set of wires to permit electrical flow therebetween. Such a structural configuration provides a new, useful, and unexpected result of facilitating wire splicing without having to use connectors and/or electrical tape at the end of the wires.

In a non-limiting exemplary embodiment, the electrically conductive members include a plurality of elongated metal strips statically affixed to the divider walls, respectively, and a plurality of bent metal strips dynamically positioned at the channels and abutted against the elongated metal strips, respectively. Advantageously, the plurality of elongated metal strips and the plurality of bent metal strips are configured to receive the existing first set of wires at the distal end of the junction box base and the existing second set of wires at the proximal end of the junction box base, respectively. Such a structural configuration provides a new, useful, and unexpected result of facilitating wire splicing without having to use connectors and/or electrical tape at the end of the wires.

In a non-limiting exemplary embodiment, the plurality of elongated metal strips includes a first elongated metal strip statically affixed to a first one of the divider walls and disposed at the first electrically conductive pathway, a second elongated metal strip statically affixed to a second one of the divider walls and disposed at the second electrically conductive pathway, and a third elongated metal strip statically affixed to said second one of the divider walls and disposed at the third electrically conductive pathway. Such a structural configuration provides a new, useful, and unexpected result of facilitating wire splicing without having to use connectors and/or electrical tape at the end of the wires.

In a non-limiting exemplary embodiment, the plurality of bent metal strips includes a first bent metal strip dynamically affixed to a first one of the channels and disposed at the first electrically conductive pathway, a second bent metal strip dynamically affixed to a second one of the channels and disposed at the second electrically conductive pathway, and a third bent metal strip dynamically affixed to a third one of the channels and disposed at the third electrically conductive pathway. Such a structural configuration provides a new, useful, and unexpected result of facilitating wire splicing without having to use connectors and/or electrical tape at the end of the wires.

In a non-limiting exemplary embodiment, the junction box base includes a proximal end having a first inlet disposed thereat, and a distal end having a second inlet disposed thereat. Advantageously, the first inlet is axially opposed from the second inlet. A first plurality of ridges disposed at the first inlet, and a second plurality of ridges disposed at the second inlet. Such a structural configuration provides a new, useful, and unexpected result of facilitating wire splicing without having to use connectors and/or electrical tape at the end of the wires. In particular, such ridges provide frictional contact with the surface area of the wires and thereby reduce the likelihood of undesirable wire displacement after being spliced at the junction box.

The present disclosure further includes a method of utilizing a quick junction box for enabling fast and secure electrical splicing between a first set of existing wires and a second set of existing wires. Such a method includes the steps of: providing a junction box base having a cavity suitably sized and shaped for receiving therein the first set of existing wires and the second set of existing wires; providing and housing a plurality of electrically conductive members within the junction box base; providing a junction box cover lid having a plurality of apertures for receiving a plurality of existing fasteners therethrough; providing a lock for attaching the junction box cover lid to the junction box base; and the plurality of electrically conductive members being configured for enabling electrical connections between the first set of existing wires and the second set of existing wires while the first set of existing wires and the second set of existing wires remain physically spaced apart within the junction box housing. Such a method provides a new, useful, and unexpected result of facilitating wire splicing without having to use connectors and/or electrical tape at the end of the wires.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
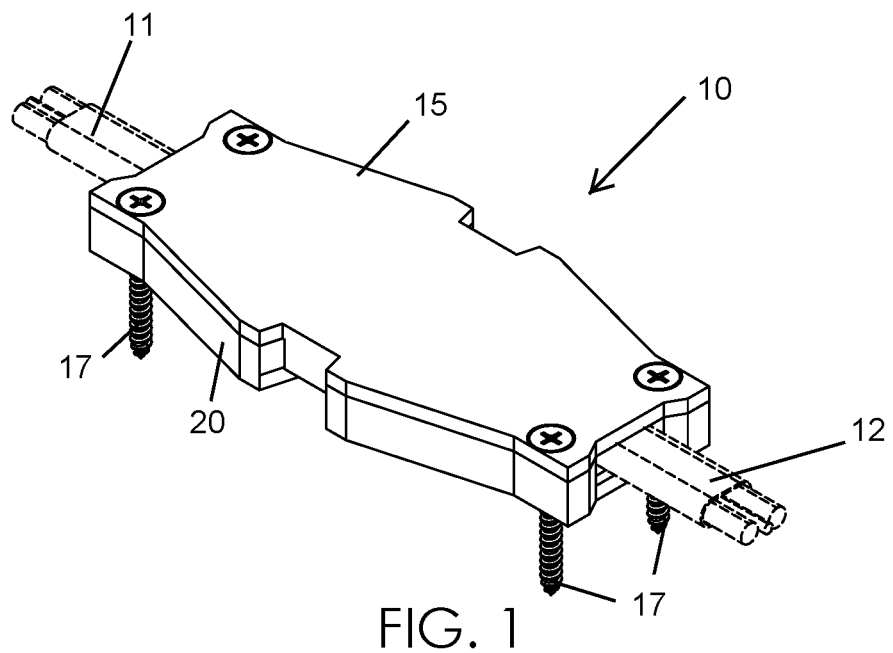
FIG. 1 is a perspective view of a quick junction box, in accordance with a non-limiting exemplary embodiment of the present disclosure.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about" means approximately or nearly and in the context of a numerical value or range set forth means ±15% of the numerical.

If used herein, "substantially" means largely if not wholly that which is specified but so close that the difference is insignificant.

Figure 2:
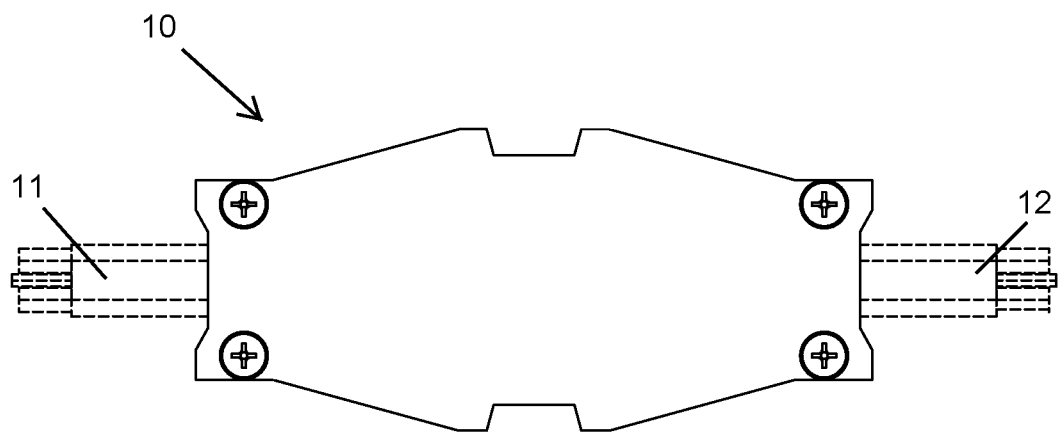
FIG. 2 is a top plan view of the quick junction box shown in FIG. 1.
Figure 3:
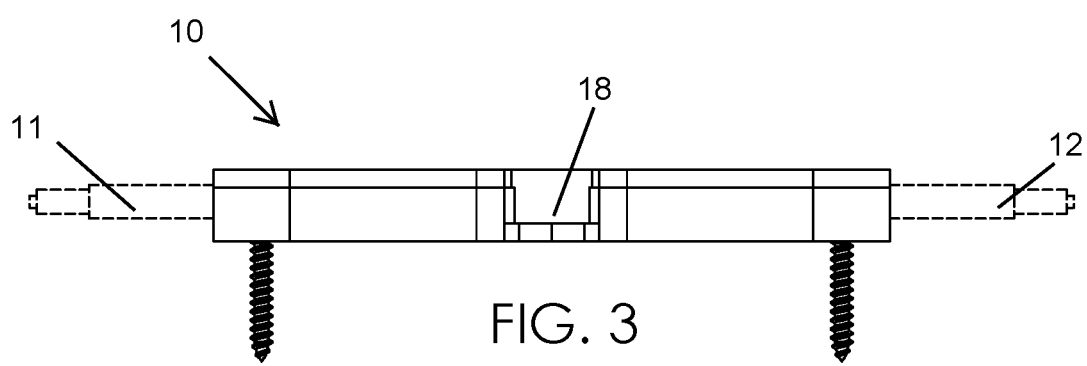
FIG. 3 is a front elevational view of the quick junction box shown in FIG. 1.
Figure 4:
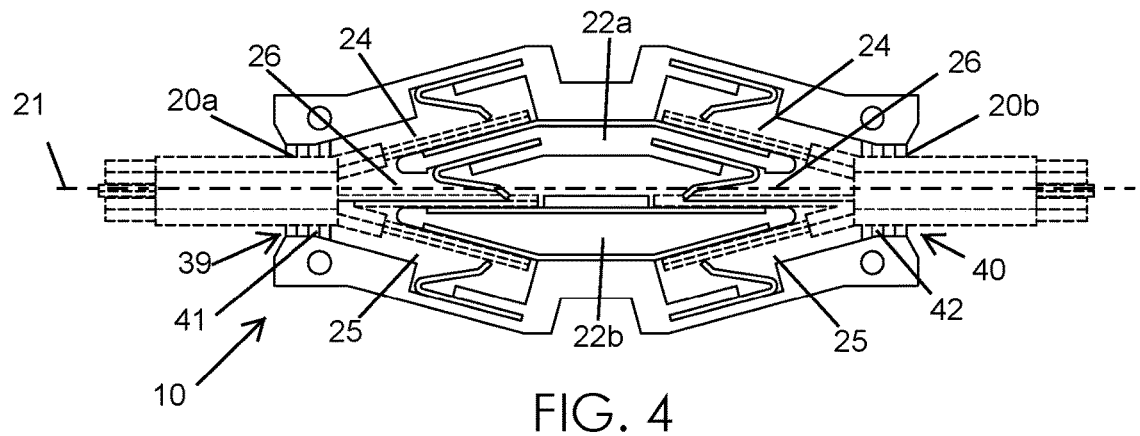
FIG. 4 is a top plan view of the quick junction box wherein the junction box cover lid has been removed from the junction box base.
Figure 5:
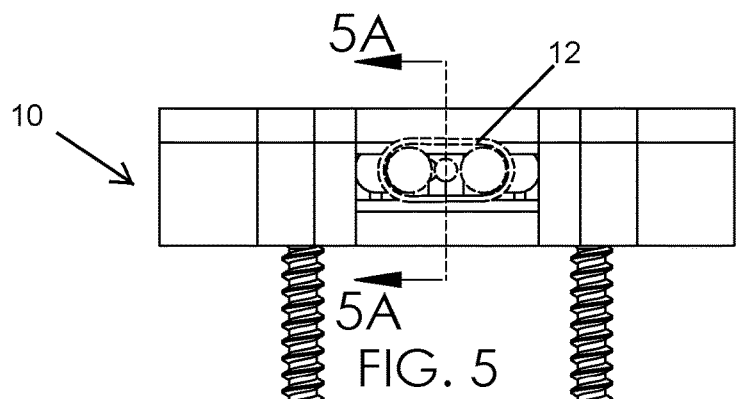
FIG. 5 is a side elevational view of the quick junction box shown in FIG. 1.
Figure 5A:
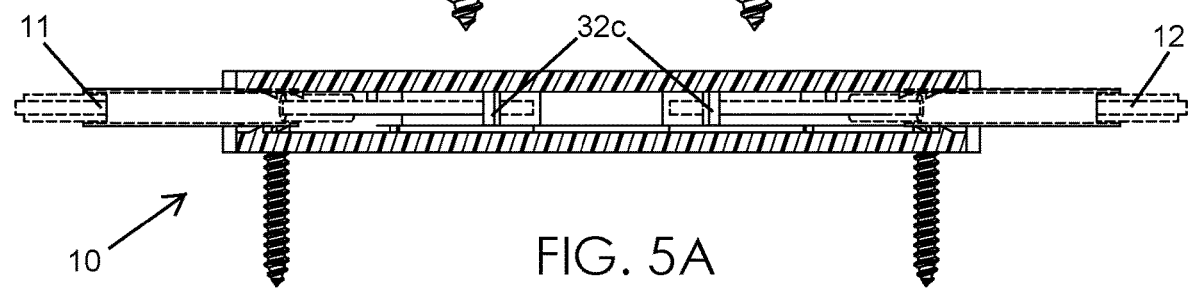
FIG. 5A is a cross-sectional view taken along line 5A-5A in FIG. 5.
Figure 6:
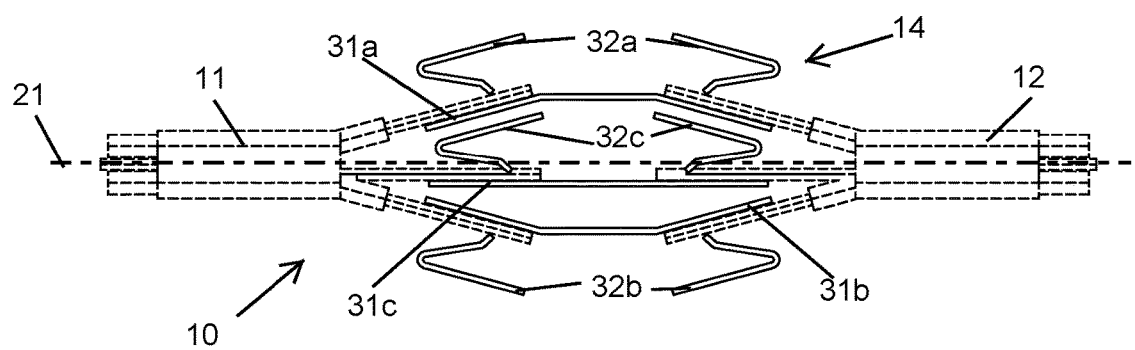
FIG. 6 is a top plan view showing the interrelationship between the elongate metal strips and bent metal strips and the first and second sets of existing wires, respectively.
Figure 7:
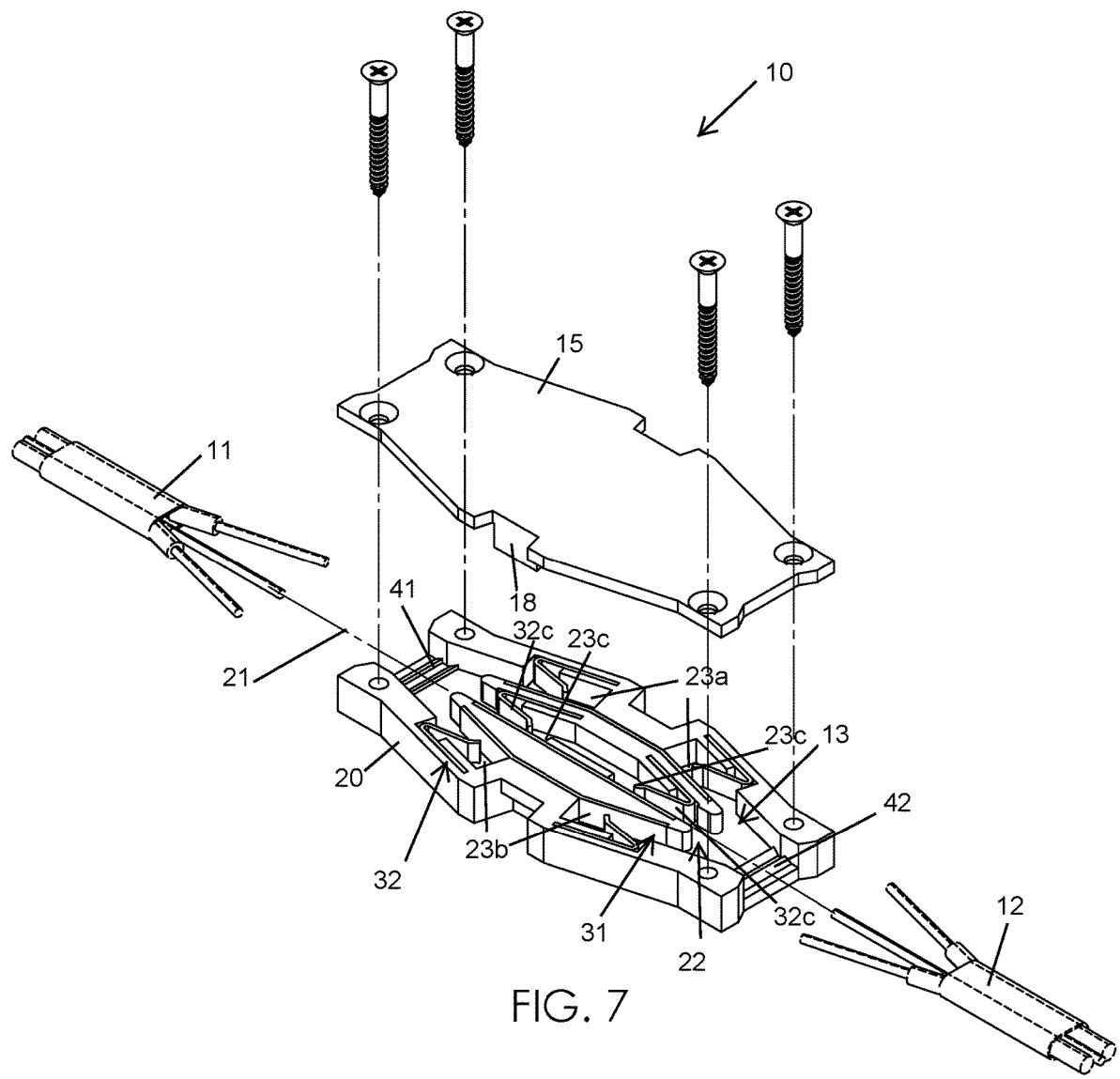
FIG. 7 is a partially exploded view of the quick junction box shown in FIG. 1.
Figure 8:
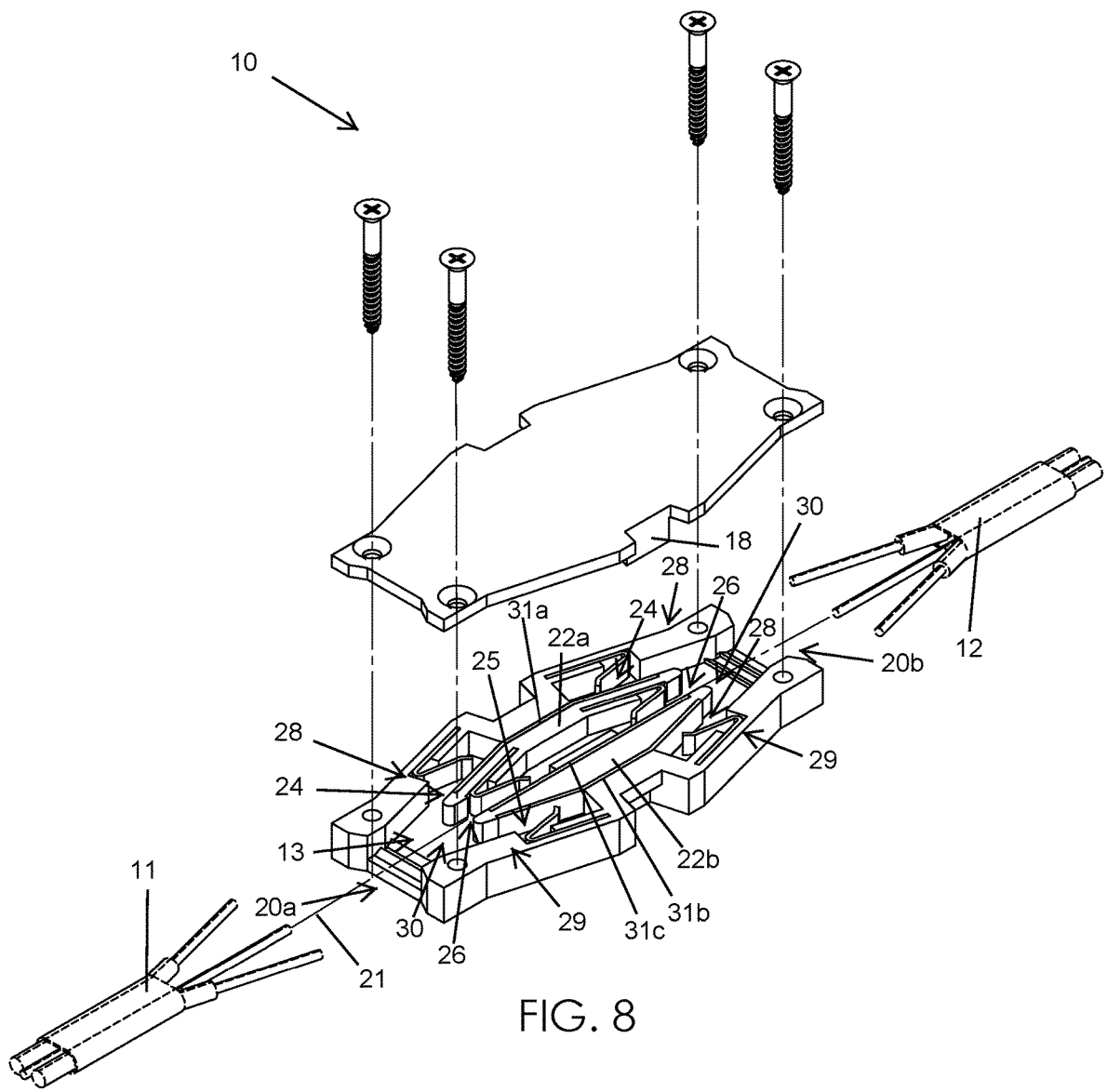
FIG. 8 is another partially exploded view of the quick junction box shown in FIG. 1.
Figure 9:
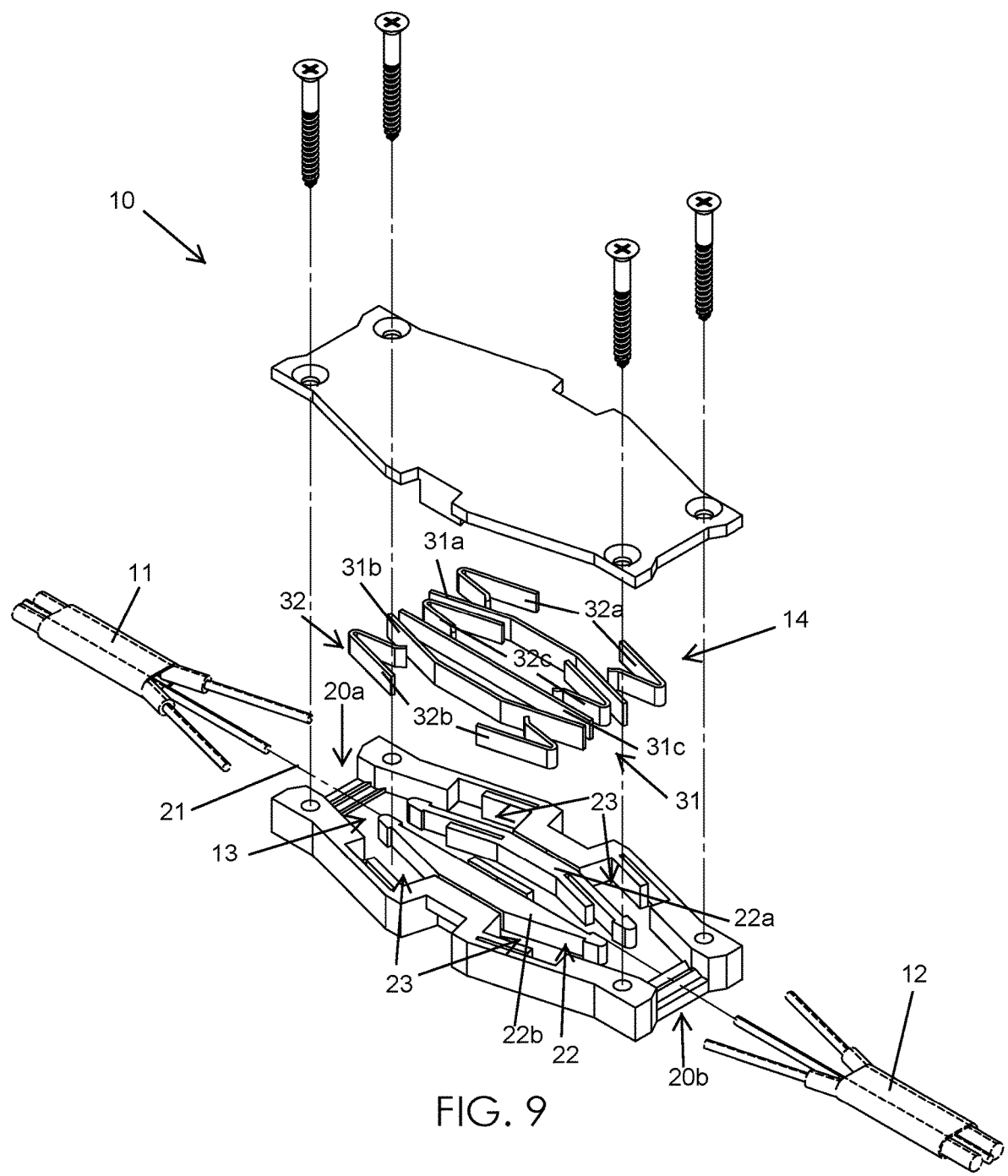
FIG. 9 is fully exploded view of the quick junction box shown in FIG. 1.

The non-limiting exemplary embodiment(s) is/are referred to generally in FIGS. 1-9 and is/are intended to provide a quick junction box 10 for enabling fast, secure, and low preparation wiring splicing. The quick junction box 10 is installed with a cover lid 15 snapped with clips (snap-fit lock) on the box. Next slide in wires 11, 12 stripped of insulation into box openings, aligning them (black to black; white to white; ground to ground) to ensure uninterrupted flow of electricity. Metal springs (electrically conductive members) push wires 11, 12 toward corresponding metal strips thereby jamming (securing) them securely in place. The box 10 is then fastened to a required surface (wall stud) through openings in the cover lid 15. Ridges 41, 42 at the box base 20 and cover lid 15 facilitate gripping the wires 11, 12 thereby providing secure fastening. In case of a required connection inspection, the lid 15 can be unfastened and snapped of off the box base 20 to reveal the inside configuration of the wires 11, 12.

Referring to FIGS. 1-9, a quick junction box 10 for enabling fast and secure electrical splicing between a first set of existing wires 11 and a second set of existing wires 12, is disclosed. The quick junction box 10 includes a junction box base 20 having a cavity 13 suitably sized and shaped for receiving therein the first set of existing wires 11 and the second set of existing wires 12, a plurality of electrically conductive members 14 housed within the junction box base 20, a junction box cover lid 15 having a plurality of apertures 16 for receiving a plurality of existing fasteners (screws) 17 therethrough, and a lock 18 (snap-fit clip) for attaching the junction box cover lid 15 to the junction box base 20. Advantageously, the plurality of electrically conductive members 14 are configured to enable electrical connections between the first set of existing wires 11 and the second set of existing wires 12 while the first set of existing wires 11 and the second set of existing wires 12 remain physically spaced apart within the junction box base 20. Such a structural configuration provides a new, useful, and unexpected result of facilitating wire splicing without having to use connectors and/or electrical tape at the end of the wires 11, 12.

In a non-limiting exemplary embodiment, the junction box base 20 includes a centrally registered longitudinal axis 21, a plurality of divider walls 22 equidistantly offset from the centrally registered longitudinal axis 21, respectively, and a plurality of channels 23 abutted against the divider walls 22 and situated at generally opposed corners of the junction box base 20, respectively. Advantageously, the divider walls 22 are spaced apart from each other, and the channels 23 are spaced apart from each other. Such a structural configuration provides a new, useful, and unexpected result of facilitating wire splicing without having to use connectors and/or electrical tape at the end of the wires 11, 12.

In a non-limiting exemplary embodiment, each end 20a, 20b of the junction box base 20 further includes a first electrically conductive pathway 24 disposed at a first region 28 of the cavity 13, a second electrically conductive pathway 25 disposed at a second region 29 of the cavity 13 opposite to the first region 28 of the cavity 13, and a third electrically conductive pathway 26 disposed at a third region 30 of the cavity 13 and intermediately positioned between the first region 28 and the second region 29. Advantageously, each of the first electrically conductive pathway 24, the second electrically conductive pathway 25, and the third electrically conductive pathway 26 are configured to receive a corresponding one of the existing first set of wires 11 and a corresponding one of the existing second set of wires 12 to permit electrical flow therebetween. Such a structural configuration provides a new, useful, and unexpected result of facilitating wire splicing without having to use connectors and/or electrical tape at the end of the wires 11, 12.

In a non-limiting exemplary embodiment, the electrically conductive members 14 include a plurality of elongated metal strips 31 statically affixed to the divider walls 22, respectively, and a plurality of bent metal strips 32 dynamically positioned at the channels 23 and abutted against the elongated metal strips 31, respectively. Such bent metal strips 32 may be resilient and generally V-shaped such that they provide a resistive force when compressed. Advantageously, the plurality of elongated metal strips 31 and the plurality of bent metal strips 32 are configured to receive the existing first set of wires 11 at the distal end 20b of the junction box base 20 and the existing second set of wires 12 at the proximal end 20a of the junction box base 20, respectively. Such a structural configuration provides a new, useful, and unexpected result of facilitating wire splicing without having to use connectors and/or electrical tape at the end of the wires 11, 12.

In a non-limiting exemplary embodiment, the plurality of elongated metal strips 31 includes a first elongated metal strip 31a statically affixed to a first one 22a of the divider walls 22 and disposed at the first electrically conductive pathway 24, a second elongated metal strip 31b statically affixed to a second one 22b of the divider walls 22 and disposed at the second electrically conductive pathway 25, and a third elongated metal strip 31c statically affixed to said second one 22b of the divider walls 22 and disposed at the third electrically conductive pathway 26. Such a structural configuration provides a new, useful, and unexpected result of facilitating wire splicing without having to use connectors and/or electrical tape at the end of the wires 11, 12.

In a non-limiting exemplary embodiment, the plurality of bent metal strips 32 includes a first bent metal strip 32a dynamically affixed to a first one 23a of the channels 23 and disposed at the first electrically conductive pathway 24, a second bent metal strip 32b dynamically affixed to a second one 23b of the channels 23 and disposed at the second electrically conductive pathway 25, and a third bent metal strip 32c dynamically affixed to a third one 23c of the channels 23 and disposed at the third electrically conductive pathway 26. Such a structural configuration provides a new, useful, and unexpected result of facilitating wire splicing without having to use connectors and/or electrical tape at the end of the wires 11, 12.

In a non-limiting exemplary embodiment, the junction box base 20 includes a proximal end 20a having a first inlet 39 disposed thereat, and a distal end 20b having a second inlet 40 disposed thereat. Advantageously, the first inlet 39 is axially opposed from the second inlet 40 so that the first set of wires 11 are axially opposed from the second set of wires 12 during insertion into the junction box base 20. A first plurality of ridges 41 are disposed at the first inlet 39, and a second plurality of ridges 42 are disposed at the second inlet 40. Such a structural configuration provides a new, useful, and unexpected result of facilitating wire splicing without having to use connectors and/or electrical tape at the end of the wires 11, 12. In particular, such ridges 41, 42 provide frictional contact with the surface area of the wires 11, 12 and thereby reduce the likelihood of undesirable wire 11, 12 displacement after being spliced at the junction box base 20.

The present disclosure further includes a method of utilizing a quick junction box 10 for enabling fast and secure electrical splicing between a first set of existing wires 11 and a second set of existing wires 12. Such a method includes the steps of: providing a junction box base 20 having a cavity 13 suitably sized and shaped for receiving therein the first set of existing wires 11 and the second set of existing wires 12; providing and housing a plurality of electrically conductive members 14 within the junction box base 20; providing a junction box cover lid 15 having a plurality of apertures 16 for receiving a plurality of existing fasteners 17 therethrough; providing a lock 18 for attaching the junction box cover lid 15 to the junction box base 20; and the plurality of electrically conductive members 14 being configured for enabling electrical connections between the first set of existing wires 11 and the second set of existing wires 12 while the first set of existing wires 11 and the second set of existing wires 12 remain physically spaced apart within the junction box base 20. Such a method provides a new, useful, and unexpected result of facilitating wire splicing without having to use connectors and/or electrical tape at the end of the wires 11, 12.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A quick junction box for enabling fast and secure electrical splicing between a first set of existing wires and a second set of existing wires, said quick junction box comprising:
   a junction box base having a cavity suitably sized and shaped for receiving therein the first set of existing wires and the second set of existing wires; and
   a plurality of electrically conductive members housed within said junction box base;
   wherein said plurality of electrically conductive members are configured to enable electrical connections between the first set of existing wires and the second set of existing wires while the first set of existing wires and the second set of existing wires remain physically spaced apart within said junction box base;
   wherein said junction box base includes
      a plurality of divider walls, and
      a plurality of channels abutted against said divider walls and situated at generally opposed corners of said junction box base, respectively;
   wherein said electrically conductive members include
      a plurality of elongated curvilinear metal strips statically affixed to lateral sides of said divider walls, respectively, and
      a plurality of bent metal strips dynamically positioned in said channels and abutted against said elongated metal strips, respectively;
      wherein said bent metal strips are resilient V-shaped metal springs configured to provide a resistive force when compressed;
      wherein said channels are configured to receive the electrical connections between the first set of existing wires and the second set of existing wires while the first set of existing wires and the second set of existing wires remain seated inside said channels and disposed below a top surface of said divider walls.

2. The quick junction box of claim 1,
   wherein said divider walls are spaced apart from each other;
   wherein said channels are spaced apart from each other.

3. The quick junction box of claim 2, wherein said junction box base further comprises:
   a first electrically conductive pathway disposed at a first region of said cavity;

a second electrically conductive pathway disposed at a second region of said cavity opposite to said first region of said cavity; and a third electrically conductive pathway disposed at a third region of said cavity and intermediately positioned between said first region and said second region;

wherein each of said first electrically conductive pathway, said second electrically conductive pathway, and said third electrically conductive pathway are configured to receive a corresponding one of the existing first set of wires and a corresponding one of the existing second set of wires to permit electrical flow therebetween.

4. The quick junction box of claim 3, wherein said plurality of elongated metal strips and said plurality of bent metal strips are configured to receive the existing first set of wires at said distal end of said junction box base and the existing second set of wires at said proximal end of said junction box base, respectively.

5. The quick junction box of claim 4, wherein said plurality of elongated metal strips comprises:

a first elongated metal strip statically affixed to a first one of said divider walls and disposed at said first electrically conductive pathway;

a second elongated metal strip statically affixed to a second one of said divider walls and disposed at said second electrically conductive pathway; and a third elongated metal strip statically affixed to said second one of said divider walls and disposed at said third electrically conductive pathway.

6. The quick junction box of claim 5, wherein said plurality of bent metal strips comprises:

a first bent metal strip dynamically affixed to a first one of said channels and disposed at said first electrically conductive pathway;

a second bent metal strip dynamically affixed to a second one of said channels and disposed at said second electrically conductive pathway; and a third bent metal strip dynamically affixed to a third one of said channels and disposed at said third electrically conductive pathway.

7. The quick junction box of claim 1, wherein said junction box base comprises:

a proximal end having a first inlet disposed thereat;

a distal end having a second inlet disposed thereat, wherein said first inlet is axially opposed from said second inlet;

a first plurality of ridges disposed at said first inlet; and a second plurality of ridges disposed at said second inlet.

8. A quick junction box for enabling fast and secure electrical splicing between a first set of existing wires and a second set of existing wires, said quick junction box comprising:

a junction box base having a cavity suitably sized and shaped for receiving therein the first set of existing wires and the second set of existing wires;

a plurality of electrically conductive members housed within said junction box base;

a junction box cover lid having a plurality of apertures for receiving a plurality of existing fasteners therethrough; and a lock for attaching said junction box cover lid to said junction box base;

wherein said plurality of electrically conductive members are configured to enable electrical connections between the first set of existing wires and the second set of existing wires while the first set of existing wires and the second set of existing wires remain physically spaced apart within said junction box base;

wherein said junction box base includes
a plurality of divider walls, and
a plurality of channels abutted against said divider walls and situated at generally opposed corners of said junction box base, respectively;

wherein said electrically conductive members include
a plurality of elongated curvilinear metal strips statically affixed to lateral sides of said divider walls, respectively, and
a plurality of bent metal strips dynamically positioned in said channels and abutted against said elongated metal strips, respectively;

wherein said bent metal strips are resilient V-shaped metal springs configured to provide a resistive force when compressed;

wherein said channels are configured to receive the electrical connections between the first set of existing wires and the second set of existing wires while the first set of existing wires and the second set of existing wires remain seated inside said channels and disposed below a top surface of said divider walls.

9. The quick junction box of claim 8, wherein said divider walls are spaced apart from each other;

wherein said channels are spaced apart from each other.

10. The quick junction box of claim 9, wherein said junction box base further comprises:

a first electrically conductive pathway disposed at a first region of said cavity;

a second electrically conductive pathway disposed at a second region of said cavity opposite to said first region of said cavity; and a third electrically conductive pathway disposed at a third region of said cavity and intermediately positioned between said first region and said second region;

wherein each of said first electrically conductive pathway, said second electrically conductive pathway, and said third electrically conductive pathway are configured to receive a corresponding one of the existing first set of wires and a corresponding one of the existing second set of wires to permit electrical flow therebetween.

11. The quick junction box of claim 10, wherein said plurality of elongated metal strips and said plurality of bent metal strips are configured to receive the existing first set of wires at said distal end of said junction box base and the existing second set of wires at said proximal end of said junction box base, respectively.

12. The quick junction box of claim 11, wherein said plurality of elongated metal strips comprises:

a first elongated metal strip statically affixed to a first one of said divider walls and disposed at said first electrically conductive pathway;

a second elongated metal strip statically affixed to a second one of said divider walls and disposed at said second electrically conductive pathway; and a third elongated metal strip statically affixed to said second one of said divider walls and disposed at said third electrically conductive pathway.

13. The quick junction box of claim 12, wherein said plurality of bent metal strips comprises:

a first bent metal strip dynamically affixed to a first one of said channels and disposed at said first electrically conductive pathway;

a second bent metal strip dynamically affixed to a second one of said channels and disposed at said second electrically conductive pathway; and a third bent metal strip dynamically affixed to a third one of said channels and disposed at said third electrically conductive pathway.

14. The quick junction box of claim 8, wherein said junction box base comprises:
- a proximal end having a first inlet disposed thereat;
- a distal end having a second inlet disposed thereat, wherein said first inlet is axially opposed from said second inlet;
- a first plurality of ridges disposed at said first inlet; and
- a second plurality of ridges disposed at said second inlet.

15. A method of utilizing a quick junction box for enabling fast and secure electrical splicing between a first set of existing wires and a second set of existing wires, said method comprising the steps of:
- providing a junction box base having a cavity suitably sized and shaped for receiving therein the first set of existing wires and the second set of existing wires;
- providing and housing a plurality of electrically conductive members within said junction box base;
- providing a junction box cover lid having a plurality of apertures for receiving a plurality of existing fasteners therethrough;
- providing a lock for attaching said junction box cover lid to said junction box base; and
- said plurality of electrically conductive members being configured for enabling electrical connections between the first set of existing wires and the second set of existing wires while the first set of existing wires and the second set of existing wires remain physically spaced apart within said junction box base;

wherein said junction box base includes
- a plurality of divider walls, and
- a plurality of channels abutted against said divider walls and situated at generally opposed corners of said junction box base, respectively;

wherein said electrically conductive members include
- a plurality of elongated curvilinear metal strips statically affixed to lateral sides of said divider walls, respectively, and
- a plurality of bent metal strips dynamically positioned in said channels and abutted against said elongated metal strips, respectively;

wherein said bent metal strips are resilient V-shaped metal springs configured to provide a resistive force when compressed;

wherein said channels are configured to receive the electrical connections between the first set of existing wires and the second set of existing wires while the first set of existing wires and the second set of existing wires remain seated inside said channels and disposed below a top surface of said divider walls.

\* \* \* \* \*